United States Patent

[11] 3,593,799

| [72] | Inventors | Lowell D. Boughton;<br>Samuel A. Pence, Jr.; Duane L. Stude;<br>Clare H. Kucera, all of Tulsa, Okla. |
|---|---|---|
| [21] | Appl. No. | 845,838 |
| [22] | Filed | July 29, 1969 |
| [45] | Patented | July 20, 1971 |
| [73] | Assignee | The Dow Chemcial Company<br>Midland, Mich. |

[54] METHOD OF SEALING A SPACE WITH A HYDROPHILIC SOLID GEL
3 Claims, 1 Drawing Fig.

[52] U.S. Cl................................................. 166/295,
61/35, 61/41, 264/35, 264/36
[51] Int. Cl..................................................... E04b 1/16,
E21b 33/14, E21d 5/012
[50] Field of Search........................................... 166/285,
287, 289, 292, 294, 295; 61/41.35; 264/35, 36

[56] References Cited
UNITED STATES PATENTS

| 3,056,757 | 10/1962 | Rakowitz | 166/295 X |
| 3,238,973 | 3/1966 | Roach | 166/285 X |
| 3,306,870 | 2/1967 | Eilers et al. | 166/295 X |
| 3,330,122 | 7/1967 | Janner | 61/41 X |
| 3,474,866 | 10/1969 | Dellinger et al. | 166/289 |

Primary Examiner—Ian A. Calvert
Attorneys—Griswold and Burdick, William R. Norris and Lloyd S. Jowanovitz ABSTRACT: A technique is provided for forming watertight enclosed seals against solid surfaces in which sealing pressure is regulated in a moisture containing environment. The sealing materials utilized are hydrophilic solid gels prepared from water soluble polymers in a suitable solvent medium. Pressure on sealing interfaces is regulated by venting the enclosed mass of solid gel. In a preferred embodiment, a bladder containing a readily flowable liquid is incorporated into the solid gel. Venting of the bladder uniformly adjusts pressure throughout the entire seal. Optionally, means may be provided for continuous pressure readings in the solid gel.

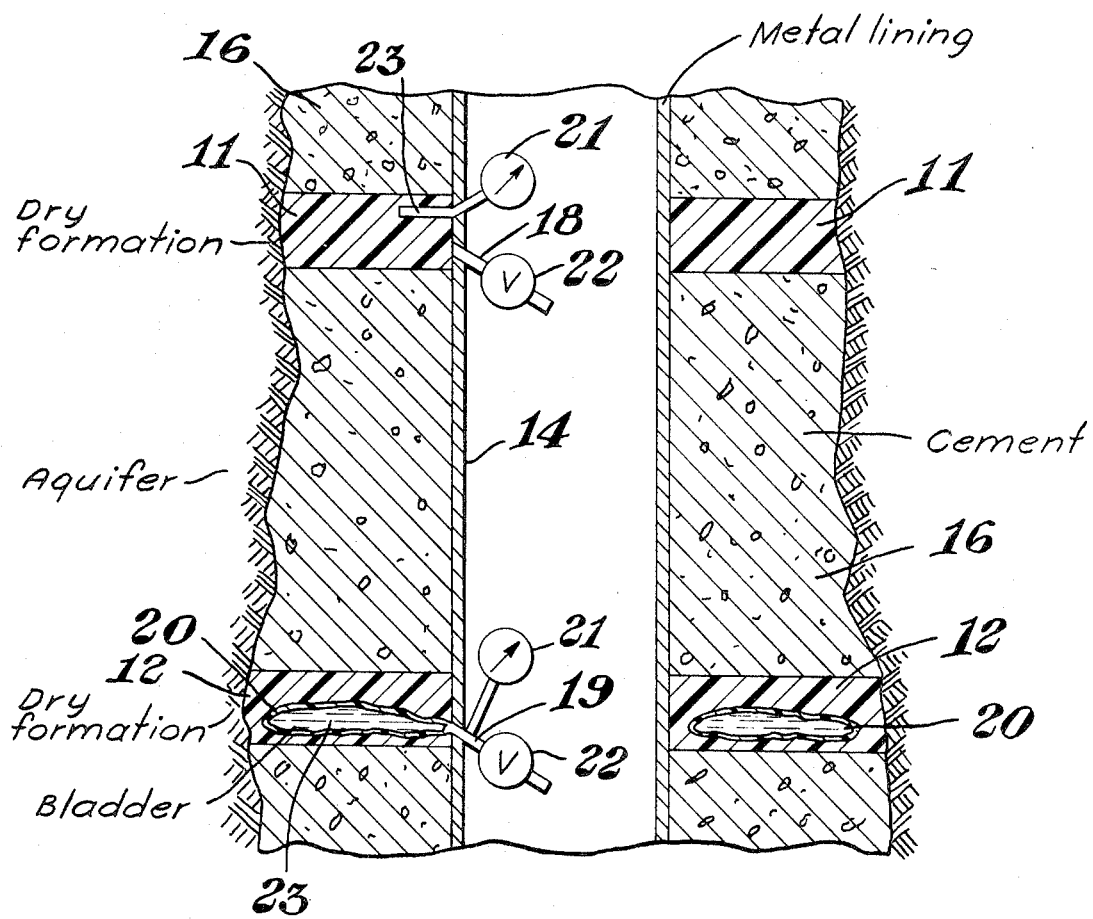

METHOD OF SEALING A SPACE WITH A HYDROPHILIC SOLID GEL

It is known that cementitious hydrophilic solid gels are prepared from mixtures of water soluble polymers and water-miscible media. Illustrative of such gels are those taught by Eilers et al. in U.S. Pat. No. 3,306,870. Other systems which produce cementitious solid gels utilizing water-soluble polymers as a cement matrix are described in French Pat. No. 1,497,665. In the latter instance, several distinct cementitious formulations are prepared from organo solvent systems and water-soluble, particulate organic polymers. The gels are usually prepared from a slurry of the polymer in the solvent. Subsequently, the slurry sets to a shape retaining solid gel having excellent adhesive and cohesive properties which render the material most advantageous for use in a variety of sealing applications for oil and gas wells, tunnels, mine shafts, construction foundations and the like. Because of their strength properties, such solid gels are highly useful as gasketing materials where water penetration is to be prevented between solid surfaces.

One of the major advantages of seals made with the aforedescribed solid gels is their self-adjusting characteristics. Should there be motion of one solid surface relative to another or a general deterioration in one of the surfaces, such sealing materials automatically conform to the new surface presented and form a new bond therewith. This occurs as a result of the gel imbibing moisture from its environment. It is characteristic of such hydrophilic gels that they will continue to imbibe available moisture to generate very high internal pressures making it possible to select and maintain sealing pressures within practical pressure ranges.

It would be desirable, in view of the foregoing, to provide an improved sealing method utilizing cementitious hydrophilic solid gels.

A particular object is to provide a method for uniformly relieving pressure on hydrophilic solid gel seals.

The above objects and other advantages as will become apparent hereinafter, are accomplished in the instant invention. In one embodiment of this invention, a hydrophilic solid gel is introduced into a zone enclosed by solid surfaces to be sealed against the passage of moisture. The hydrophilic gel is completely enclosed and it imbibes water from its environment to build up pressure on the sealing interfaces. This pressure is then maintained at a predetermined level by venting the hydrophilic gel. This venting is readily accomplished simply by opening ports communicating with the body of hydrophilic gel. Preferably, however, it is accomplished by means of a bladder containing a readily flowable liquid introduced into the hydrophilic solid gel. Sealing pressures are then maintained by reducing pressures that develop within the bladder. Initially, and until the gel develops pressure by imbibing water, the sealing pressure can be maintained by increasing the pressure on the liquid within the bladder. Such pressure adjustments are thereby distributed uniformly throughout the entire hydrophilic gel seal.

Optionally, pressure gauges are installed to measure the sealing pressures. Suitable pressure measurements are readily accomplished by the installation of strain gauges on the confining solid surfaces, the insertion of pressure transducers into the hydrophilic gel solid, by measuring liquid pressure within the bladder of the preferred embodiment above, and the like.

Hydrophilic gel cements useful in the instant invention are described by Eilers et al. in U.S. Pat. No. 3,306,870 and French Pat. No. 1,497,655. Such hydrophilic gels may be readily modified by the incorporation of inert fillers and aggregate. The solid cement may be prepared in situ, that is a slurry of the water-soluble polymer is prepared in a suitable water-miscible medium and the resulting slurry introduced into the enclosed cavity in which a seal is desired. Alternately, the hydrophilic gel cement can be preset and incorporated into the enclosed zone to be sealed as a preformed article or a series of articles, e.g., bricks, rings and miscellaneous shapes.

Sealing pressure in the latter instance is readily developed by subjecting the hydrophilic gels to external pressure, e.g., hydraulic pressure or by physical clamping devices. Optionally, sealing pressures can be allowed to develop as the hydrophilic solid gel imbibes moisture from its environment. Once a desired sealing pressures has been developed, it is desirable, and a feature of the instant invention, to relieve any increases in pressure as necessary to maintain the predetermined desired level.

Practice according to the instant invention is illustrated in the accompanying drawing.

In the drawing, the particular sealing application involved isolating water movement in the annulus of a subterranean shaft that traverses an aquifer. The shaft liner 14 is generally cemented in place with an ordinary hydraulic cement 16, but above and below the aquifer in the adjacent formation, the enclosed hydrophilic solid gel seals 11 and 12 were introduced and enclosed between cement 16 layers, the shaft liner 14 and the dry formation. It is desirable in this application to limit pressures developed by the hydrophilic solid gels to avoid any possibility of misshaping the liner 14 and/or crushing the dry formation.

In the upper seal 11, pressure maintenance is accomplished by directly discharging hydrophilic solid gel through vent 18 and valve 22. These gels will vary in their extrudability but in general they will readily pass through openings as small as found in valves for 1 inch piping under sufficient pressure. More uniform and immediate pressure control is achieved by the regulation of pressure on a readily flowable liquid 23, contained within a bladder 20 as shown in seal 12. This is readily accomplished through a vent 19 and valve 22. Suitable valves include needle, gate, slide and ball valves.

Pressures on the bladder liquid 23 are conveniently determined by any liquid pressure gauge 21. A pressure transducer 23 is used to measure pressures within the solid gel seal 11. As will be apparent to persons skilled in the art, pressure readings and valve operations are readily mechanized to provide remote control of these functions. For example, in an oil well, it is contemplated that the illustrated valving and pressure measuring functions would be accomplished through remote controls not depicted.

Hydrophilic solid gels that can be used include those described in the aforementioned patents. A typical and preferred formulation comprises an aqueous solution consisting, by weight, of 38.1 percent $CaCl_2$ and 4.7 percent $FeCl_3$ dissolved in water. A powdered polymer was admixed with the aforementioned aqueous salt solution at a concentration of 4 pounds of polymer per gallon of slurry at 75° F. The resulting dispersion was pumped into a 2 inch pipe until it was substantially filled. After 96 hours the polymer was found to be completely gelled to give a solid gel suitable for use in the instant invention.

The cross-linked polymer used in the above example was prepared by polymerizing acrylamide with 4,600 parts of N,N' methylene-bisacrylamide per million parts of acrylamide in the presence of a redox catalyst system comprised of sodium thiosulfate and potassium bisulfate. The polymer had a molecular weight of about 1,000,000 and was about 4 percent to 5 percent hydrolyzed. The polymer was drum dried and ground to a particle size of between about 20 mesh and 325 mesh.

Other hydrophilic solid gels that can be used include those described in Canadian Pat. No. 795,843 to Samuel A. Pence, Jr. A typical and preferred formulation was prepared in the following manner.

An aqueous solution of 0.468 gram of $Na_2CrO_4 \cdot 4H_2O$ in 5 ml. of 3 percent $H_2SO_4$ and a separate solution of 0.948 gram $Na_2S_2O_3 \cdot 5H_2O$ in 10 ml. of water were added to 85 ml. of a 1:4 volume mixture of glycerol:diethylene glycol, to which was thereafter added 60 grams of polyacrylamide. The resulting mixture was stirred thoroughly to make a uniform dispersion. The dispersion had an initial pH of 6. A pea-green gel formed within 5 minutes, which further gelled 30 minutes after initial mixing to give a material with rubberlike consistency, i.e., it was tough, resilient, and resistant to water. The color of the gelled solid was a uniform pea-green throughout, and the composition was found by standard tests to be water resistant. The resulting hydrophilic solid gel was suitable for use in the instant invention.

The slurry prepared above is introduced into the annulus between the metal liner 14 and the adjacent formation as a layer of liquid which ultimately sets to form the hydrophilic solid gel seal 12. As the liquid slurry polymer is introduced, a bladder 23 is emplaced in the liquid slurry before it sets into the solid hydrophilic solid gel. This bladder is equipped with a pressure gauge 22 and a vent 19 for charging or releasing liquid as necessary to maintain a desired sealing pressure.

After the initial charge of solid gel is set, an additional charge of ordinary cement 16 is introduced, building up the lining in the annulus to above the aquifer. Cementing was again terminated and in a manner similar to that described above, a second solid gel seal was formed in situ. This seal is equipped with a simple vent for direct release of gel as pressure exceeds desired limits. A pressure transducer 21 is utilized to make pressure readings.

Thus, as depicted in cross section, a subterranean shaft is sealed to adjacent formation to prevent the passage of water in the annulus. Pressure throughout the life of the seal is readily maintained within the desired limits by venting gel pressure directly from the seal.

Numerous modifications may be made in the practice of the instant invention without departing from the spirit and scope thereof. Particularly, the pressure on any enclosed seal of a hydrophilic solid gel is readily maintained by venting gases as well as liquids from within the gel. In addition to introducing seals between metal casings and subterranean formations, the invention is applicable to the sealing of voids between flanges at joints in conduits. A seal with constant pressure at the sealing interfaces is readily maintained by venting liquid from within the gel as the system imbibes moisture from its environment.

The invention has been demonstrated to operate even under relatively dry conditions. It is only essential to maintenance of the seal pressure that some moisture be present in the formation or have intermittent access to the seal between solid surfaces enclosing it. The gel imbibes the water thereby always maintaining pressure and the propensity to be self-conforming to any changes in its confining surfaces.

What I claim is:

1. A method for sealing space enclosed between solid surfaces against the flow of moisture which comprises introducing a hydrophilic solid gel into the enclosed space, placing a vented bladder containing a readily flowable liquid in the hydrophilic solid gel and maintaining the pressure of said gel at a predetermined level by release of the readily flowable liquid from the bladder.

2. A method as in claim 1 wherein the enclosed space is in the annulus between a subterranean shaft and the adjacent formation.

3. A method as in claim 2 wherein the hydrophilic solid gel is hydraulically prepressurized.